Sept. 25, 1951     E. W. HOPKINS     2,568,735
SECURING MEANS
Filed Oct. 14, 1946
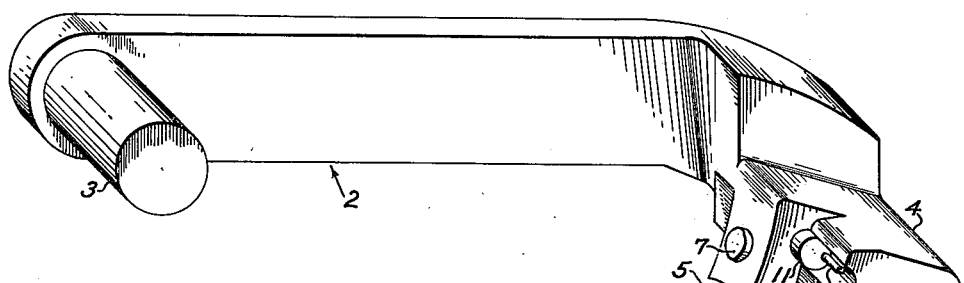
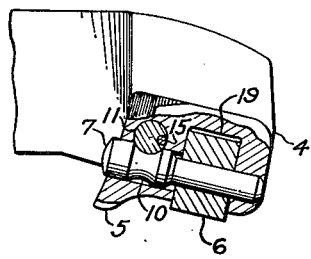
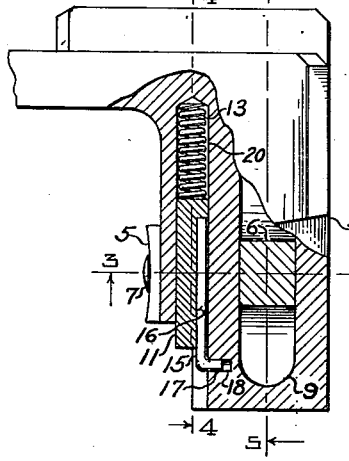
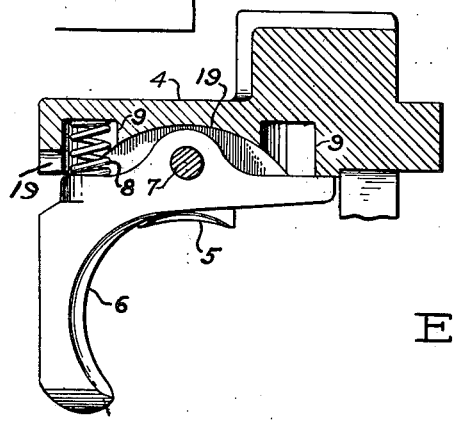
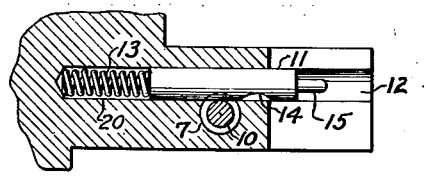
INVENTOR.
Edward W. Hopkins
BY
ATTORNEYS Patented Sept. 25, 1951

2,568,735

UNITED STATES PATENT OFFICE 2,568,735

SECURING MEANS

Edward W. Hopkins, Longmeadow, Mass.

Application October 14, 1946, Serial No. 703,109

2 Claims. (Cl. 89—33)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to means for pivotally securing a reversible element.

There are many constructions in which it is of particular advantage to pivotally secure an element in one position and yet have such securing means readily removable so as to allow changing of the element to an opposite position. One such construction is the extractor assembly in a machine gun of the Browning type.

In high speed firing of the above machine gun, improved results have been obtained by mounting the ejector so that the curved portion thereof faces the side from which the rounds are to be fed. However, in certain instances it is particularly advantageous that the feeding direction of the cartridge belt be reversed. It is therefore necessary that the ejector also be reversed so that the curved portion will face in the opposite direction.

Accordingly, it is an object of this invention to provide improved securing means for a construction having a reversible element such as the ejector in a machine gun of the Browning type.

The specific nature of the invention as well as other objects and advantages thereof will clearly appear from a description of a preferred embodiment as shown in the accompanying drawings in which:

Fig. 1 is a perspective view of a machine gun extractor assembly having an ejector member associated therewith through means of the improved device of this invention;

Fig. 2 is a fragmentary top view showing in partial cross-section the securing means of the present invention;

Fig. 3 is a partial cross-sectional view taken along the line 3—3 in Fig. 2;

Fig. 4 is a fragmentary cross-sectional view taken along the line 4—4 in Fig. 2; and Fig. 5 is a cross-sectional view taken along the line 5—5 in Fig. 2.

There is shown in Fig. 1 an extractor assembly 2 having at one end a transverse pin 3 provided for mounting the assembly to a reciprocating bolt (not shown) typical in Browning type machine guns. At the other end of assembly 2 is a head portion 4 having a claw portion 5 for engagement with the annular groove found at the head of a cartridge (not shown). Also shown is an ejector 6 for guiding the cartridge into the conventional T-slot of the bolt and eventually ejecting the empty case after the cartridge has been fired. The top of ejector 6 fits within a longitudinal slot 19 provided on the underside of head portion 4.

Ejector 6 is here pivotally secured to extractor assembly 2 by means of a pin 7 extending transversely through extractor head portion 4. As shown in Fig. 5, head portion 4 is provided with two recesses 9, one on either end of longitudinal slot 19, such recesses being adapted to house a helical coil spring 8 whereby ejector 6 is urged in either of the two directions in which cartridges can be fed.

An annular groove 10 is provided in the head portion of ejector pin 7 and is adapted to receive a retaining pin 11. A hole 20 is provided in claw portion 5 for receiving pin 11 which when inserted in place lies transversely to the longitudinal axis of pin 7. A longitudinal semi-circular groove 12 aligned with and communicating with hole 20 is provided in head portion 4 so that pin 11 can be inserted into hole 20. Retaining pin 11 is provided with a semi-circular notch 14 for a purpose to be shown. A spring 13 seated within hole 20 exerts pressure against pin 11 and urges such pin outwardly.

A locking pin 15 extends longitudinally along a groove 16 cut in the side of retaining pin 11. Locking pin 15 has one end 17 bent at right angles to the body thereof, such end adapted to be inserted into a suitable recess 18 extending perpendicularly into groove 12.

To secure ejector 6 to extractor assembly 2, spring 13 is first inserted into hole 20 and then retaining pin 11 is placed within groove 12 and pressed forwardly into hole 20 to seat against spring 13. Groove 16 in pin 11 must face groove 12 in extractor head portion 4 whereupon notch 14 will face downwardly as shown in Fig. 4. Locking pin 15 is next inserted in groove 16 with end 17 perpendicular to groove 12 so that when urged forwardly against the pressure of spring 13, end 17 will snap into recess 18 and thereby prevent removal of pin 11. Locking pin 15 can be said to act in the manner of a key.

Spring 8 is placed in one of recesses 9, that is, whichever of the two recesses will cause spring 8 to exert force tending to pivot ejector 6 in the direction from which rounds will be fed. Ejector 6 is then assembled into slot 19 and secured by means of pin 7. In order to insert pin 7 into extractor head portion 4, retaining pin 11 must be pressed against the bias of spring 13, until notch 14 permits passage thereof. When pin 7 is fully inserted in place, retaining pin 11 moves back under urging of spring 13 until stopped by locking pin 15. As a result, ejector pin 7 is prevented from being unintentionally removed since retaining pin 11 engages annular groove 10 in ejector pin 7.

To change the position of ejector 6, pin 7 is removed and part 6 reversed, with spring 8 seated in the other of recesses 9.

Although the securing means of this invention is here shown in conjunction with a machine gun extractor assembly, it should be understood that such securing means may be utilized in any construction in which one element is intended to be releasably secured to a second element and yet be adapted to pivot in relationship thereto.

Thus there is here shown a simple and reliable means for securing a pivoted reversible element in a construction and one which will allow ready disassembly for changing the element to face in an opposite direction.

I claim:

1. As a new article of manufacture, means for releasably securing in place separate elements of a mechanism in order that at least one of the elements may be changed to, and then releasably held in a position different from its original position, comprising in combination, a body member provided with a transverse hole therein and a longitudinal hole above and intersecting said transverse hole, a pin member extending through said transverse hole and provided with an annular groove therearound, a spring-biased pin member movable in said longitudinal hole and slidably engageable with said annular groove, said body member being provided with a recess which is in a substantially parallel plane with said transverse hole, said spring-biased pin being provided with a longitudinal groove in the side thereof which is adjacent said recess in said body member, and a locking pin including a longitudinal portion disposed in said longitudinal groove and a transverse portion which is disposed in said recess whereby the relative movement of said pin member is limited.

2. As a new article of manufacture, means for releasably securing in place separate elements of a mechanism in order that at least one of the elements may be changed to, and then releasably held in a position different from its original position, comprising in combination, a body member provided with a transverse hole therethrough, a first pin member extending through said hole and provided with an annular groove therearound, a second pin member extending into said body member and movable in said groove relative to said first pin member, said second pin member being provided with a notch in a side thereof which is adapted to coincide with said transverse hole so as to receive said first pin member when said second pin member is moved to a different position relative thereto, a spring urging said second pin member outwardly relative to said first pin member, said body member being provided with a recess therein and said second pin member being provided with a longitudinal groove in the side thereof which is adjacent said recess, and a locking pin including a longitudinal portion disposed in said longitudinal groove and a transverse portion which is disposed in said recess, all adapted and arranged whereby the relative movements of said first and second pin members are limited.

EDWARD W. HOPKINS.

REFERENCES CITED

The following references are of record in the file of this patent:

UNITED STATES PATENTS

| Number | Name | Date |
| --- | --- | --- |
| 1,527,336 | Voda | Feb. 24, 1925 |
| 1,691,964 | Dickey et al. | Nov. 20, 1928 |
| 1,803,352 | Tansley | May 5, 1931 |
| 2,371,004 | Unterman | Mar. 6, 1945 |
| 2,397,325 | Newcomb | Mar. 26, 1946 |

FOREIGN PATENTS

| Number | Country | Date |
| --- | --- | --- |
| 316,588 | Italy | Apr. 10, 1934 |